(12) United States Patent
Joshi et al.

(10) Patent No.: US 9,535,619 B2
(45) Date of Patent: Jan. 3, 2017

(54) ENHANCED RECONSTRUCTION IN AN ARRAY OF INFORMATION STORAGE DEVICES BY PHYSICAL DISK REDUCTION WITHOUT LOSING DATA

(71) Applicant: Dell Products, LP, Round Rock, TX (US)

(72) Inventors: Neeraj Joshi, Puducherry (IN); Sandeep Agarwal, Alwar (IN); Deepu S. Sreedhar M, Calicut (IN)

(73) Assignee: DELL PRODUCTS, LP, Austin, TX (US)

( * ) Notice: Subject to any disclaimer, the term of this patent is extended or adjusted under 35 U.S.C. 154(b) by 60 days.

(21) Appl. No.: 14/537,039

(22) Filed: Nov. 10, 2014

(65) Prior Publication Data

US 2016/0132258 A1     May 12, 2016

(51) Int. Cl.
*G06F 12/00*     (2006.01)
*G06F 3/06*     (2006.01)

(52) U.S. Cl.
CPC .......... *G06F 3/0619* (2013.01); *G06F 3/0653* (2013.01); *G06F 3/0664* (2013.01); *G06F 3/0689* (2013.01)

(58) Field of Classification Search
None
See application file for complete search history.

(56) References Cited

U.S. PATENT DOCUMENTS

| 7,085,883 | B1 | 8/2006 | Dalgic et al. |
| 7,856,526 | B2 | 12/2010 | Shibayama et al. |
| 7,945,748 | B2 | 5/2011 | Shibayama et al. |
| 8,464,095 | B1 | 6/2013 | Bonwick |
| 2005/0060618 | A1* | 3/2005 | Guha ............... G06F 11/008 714/54 |
| 2008/0109601 | A1* | 5/2008 | Klemm ............. G06F 3/0608 711/114 |
| 2010/0011162 | A1 | 1/2010 | Wang et al. |
| 2012/0079318 | A1 | 3/2012 | Colgrove et al. |

OTHER PUBLICATIONS

"Reducing the number of devices in a RAID-5" Oct. 22, 2009. retrieved from http://blog.stalkr.net/2009/10/reducing-number-of-devices-in-raid-5.html.*

\* cited by examiner

*Primary Examiner* — Daniel Tsui
(74) *Attorney, Agent, or Firm* — Larson Newman, LLP

(57) ABSTRACT

An information handling system and method provide for receiving a request to remove a selected physical disk from a disk group realizing a virtual disk in a redundant array data storage subsystem, determining whether removal of the selected physical disk is feasible, and, when feasible, removing the selected physical disk from the disk group without deleting the virtual disk realized by the disk group and reconstructing the virtual disk to be realized by the disk group using only the proposed number of physical disks, wherein the proposed number of physical disks is less than an initial number of physical disks of the disk group.

20 Claims, 3 Drawing Sheets

ENHANCED RECONSTRUCTION IN AN ARRAY OF INFORMATION STORAGE DEVICES BY PHYSICAL DISK REDUCTION WITHOUT LOSING DATA

FIELD OF THE DISCLOSURE

The present disclosure generally relates to information handling systems, and more particularly relating to reconstructing an array of information storage devices.

BACKGROUND

As the value and use of information continues to increase, individuals and businesses seek additional ways to process and store information. One option is an information handling system. An information handling system generally processes, compiles, stores, or communicates information or data for business, personal, or other purposes. Technology and information handling needs and requirements can vary between different applications. Thus information handling systems can also vary regarding what information is handled, how the information is handled, how much information is processed, stored, or communicated, and how quickly and efficiently the information can be processed, stored, or communicated. The variations in information handling systems allow information handling systems to be general or configured for a specific user or specific use such as financial transaction processing, airline reservations, enterprise data storage, or global communications. In addition, information handling systems can include a variety of hardware and software resources that can be configured to process, store, and communicate information and can include one or more computer systems, graphics interface systems, data storage systems, networking systems, and mobile communication systems. Information handling systems can also implement various virtualized architectures. Data and voice communications among information handling systems may be via networks that are wired, wireless, or some combination.

One subsystem of an information handling system is a storage subsystem. A storage subsystem can be implemented using a redundant array of independent disks (RAID). A RAID storage subsystem comprises a RAID controller and a disk group (DG). The DG comprises a plurality of physical disks (PDs) configured to store information which is presented to the information handling system as being stored on a virtual disk (VD) even though the storage of the information is distributed among the PDs. The VD is thus realized by the DG. A PD of the PDs may be replaced by a replacement PD through the use a member replacement feature of the RAID controller. In existing RAID storage subsystems, a PD cannot be removed to reconstruct a VD using fewer than the existing number of PDs.

In an existing RAID storage subsystem, when the system has multiple disks connected and all the disks are in use (for example, all disks are used for RAID creation), if user is in need of a disk to assign as a hot spare or as hot spares for an important VD or to new create VD, the user has to delete an existing VD to make a PD free and then use it for any other operation.

For example, if the user has created a RAID level 5 VD with four PDs (for example, HDD1, HDD2, HDD3, HDD4) and the user wants to migrate to RAID level 5 with three disks (for example, HDD1, HDD2, HDD3), then the controller would not allow such migration even though RAID level 5 can be utilized with minimum of three PDs. Now, if the user is in need of a disk and doesn't have a free PD for creating new VD or to assign as a dedicated hot spare (DHS) or a global hot spare (GHS), the user cannot perform disk level migration from a RAID level 5 VD realized using four PDs to a RAID level 5 VD realized with three PDs even in a situation where the same VD data capacity can be realized using three of the four PDs.

Currently, if a RAID level 5 VD is created with four PDs (for example, HDD1 (100 GB), HDD2 (100 GB), HDD3 (100 GB), HDD4 (100 GB)) with a VD capacity of 50 GB, the individual used disk space will be 12.5 GB for each PD, where GB stands for gigabytes. Even though HDD1 (12.5 GB/100 GB), HDD2 (12.5 GB/100 GB), HDD3 (12.5 GB/100 GB), and HDD4 (12.5 GB/100 GB) each have little of their available capacity used to store data of the VD, the RAID controller will not allow migration of the VD by removing one of the PDs, for example, such as removing HDD4 (12.5 GB) and splitting its data among the other HDDs (for example, HDD1, HDD2, and HDD3).

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings indicates similar or identical items.

DETAILED DESCRIPTION OF THE DRAWINGS

The following description in combination with the Figures is provided to assist in understanding the teachings disclosed herein. The description is focused on specific implementations and embodiments of the teachings, and is provided to assist in describing the teachings. This focus should not be interpreted as a limitation on the scope or applicability of the teachings.

Figure 1:
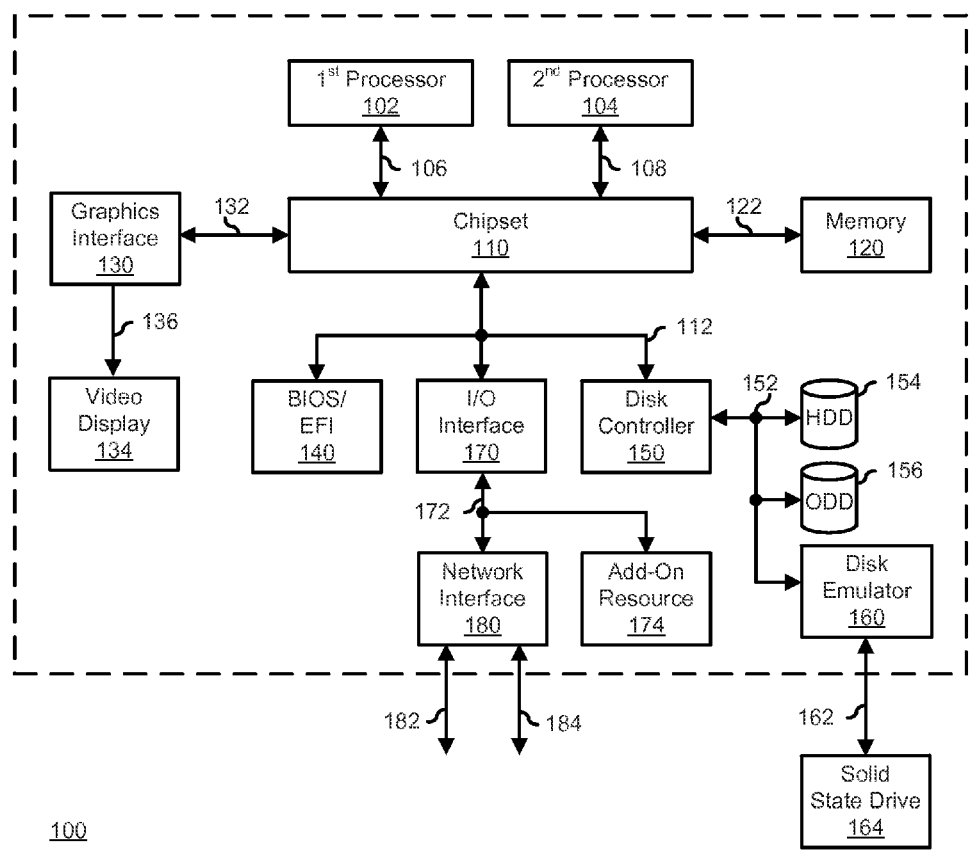
FIG. 1 is a block diagram illustrating an information handling system according to an embodiment of the present disclosure.

FIG. 1 illustrates a generalized embodiment of information handling system 100. For purpose of this disclosure information handling system 100 can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 100 can be a personal computer, a laptop computer, a smart phone, a tablet device or other consumer electronic device, a network server, a network storage device, a switch router or other network communication device, or any other suitable device and may vary in size, shape, performance, functionality, and price. Further, information handling system 100 can include processing resources for executing machine-executable code, such as a central processing unit (CPU), a programmable logic array (PLA), an embedded device such as a System-on-a-Chip (SoC), or other control logic hardware. Information handling system 100 can also include one or more computer-readable medium for storing machine-executable code, such as software or data. Additional components of information handling system 100 can include one or more storage devices that can store machine-executable code, one or more communications ports for communicating with external devices, and various input and output (I/O) devices, such as a keyboard, a mouse, and a video display. Information handling system 100 can also include one or more buses operable to transmit information between the various hardware components.

Information handling system 100 can include devices or modules that embody one or more of the devices or modules described above, and operates to perform one or more of the methods described above. Information handling system 100 includes a processors 102 and 104, a chipset 110, a memory 120, a graphics interface 130, include a basic input and output system/extensible firmware interface (BIOS/EFI) module 140, a disk controller 150, a disk emulator 160, an input/output (I/O) interface 170, and a network interface 180. Processor 102 is connected to chipset 110 via processor interface 106, and processor 104 is connected to chipset 110 via processor interface 108. Memory 120 is connected to chipset 110 via a memory bus 122. Graphics interface 130 is connected to chipset 110 via a graphics interface 132, and provides a video display output 136 to a video display 134. In a particular embodiment, information handling system 100 includes separate memories that are dedicated to each of processors 102 and 104 via separate memory interfaces. An example of memory 120 includes random access memory (RAM) such as static RAM (SRAM), dynamic RAM (DRAM), non-volatile RAM (NV-RAM), or the like, read only memory (ROM), another type of memory, or a combination thereof.

BIOS/EFI module 140, disk controller 150, and I/O interface 170 are connected to chipset 110 via an I/O channel 112. An example of I/O channel 112 includes a Peripheral Component Interconnect (PCI) interface, a PCI-Extended (PCI-X) interface, a high-speed PCI-Express (PCIe) interface, another industry standard or proprietary communication interface, or a combination thereof. Chipset 110 can also include one or more other I/O interfaces, including an Industry Standard Architecture (ISA) interface, a Small Computer Serial Interface (SCSI) interface, an Inter-Integrated Circuit ($I^2C$) interface, a System Packet Interface (SPI), a Universal Serial Bus (USB), another interface, or a combination thereof. BIOS/EFI module 140 includes BIOS/EFI code operable to detect resources within information handling system 100, to provide drivers for the resources, initialize the resources, and access the resources. BIOS/EFI module 140 includes code that operates to detect resources within information handling system 100, to provide drivers for the resources, to initialize the resources, and to access the resources.

Disk controller 150 includes a disk interface 152 that connects the disc controller to a hard disk drive (HDD) 154, to an optical disk drive (ODD) 156, and to disk emulator 160. An example of disk interface 152 includes an Integrated Drive Electronics (IDE) interface, an Advanced Technology Attachment (ATA) such as a parallel ATA (PATA) interface or a serial ATA (SATA) interface, a SCSI interface, a USB interface, a proprietary interface, or a combination thereof. Disk emulator 160 permits a solid-state drive 164 to be connected to information handling system 100 via an external interface 162. An example of external interface 162 includes a USB interface, an IEEE 1194 (Firewire) interface, a proprietary interface, or a combination thereof. Alternatively, solid-state drive 164 can be disposed within information handling system 100.

Information handling system 100 comprises a RAID storage subsystem which, for example, can comprise disk controller 150 and one or more elements connected thereto, such as HDD 154, ODD 156, and disk emulator 160 with its solid-state drive 164. Multiple instances of such elements can be used to provide the redundancy of the RAID storage subsystem. For example, the RAID storage subsystem can comprise several of HDD 154, with the several HDDs 154 serving as a DG which realizes a RAID VD and with each of the several HDDs 154 serving as a PD of the DG.

I/O interface 170 includes a peripheral interface 172 that connects the I/O interface to an add-on resource 174 and to network interface 180. Peripheral interface 172 can be the same type of interface as I/O channel 112, or can be a different type of interface. As such, I/O interface 170 extends the capacity of I/O channel 112 when peripheral interface 172 and the I/O channel are of the same type, and the I/O interface translates information from a format suitable to the I/O channel to a format suitable to the peripheral channel 172 when they are of a different type. Add-on resource 174 can include a data storage system, an additional graphics interface, a network interface card (NIC), a sound/video processing card, another add-on resource, or a combination thereof. Add-on resource 174 can be on a main circuit board, on separate circuit board or add-in card disposed within information handling system 100, a device that is external to the information handling system, or a combination thereof.

Network interface 180 represents a NIC disposed within information handling system 100, on a main circuit board of the information handling system, integrated onto another component such as chipset 110, in another suitable location, or a combination thereof. Network interface device 180 includes network channels 182 and 184 that provide interfaces to devices that are external to information handling system 100. In a particular embodiment, network channels 182 and 184 are of a different type than peripheral channel 172 and network interface 180 translates information from a format suitable to the peripheral channel to a format suitable to external devices. An example of network channels 182 and 184 includes InfiniBand channels, Fibre Channel channels, Gigabit Ethernet channels, proprietary channel architectures, or a combination thereof. Network channels 182 and 184 can be connected to external network resources (not illustrated). The network resource can include another information handling system, a data storage system, another network, a grid management system, another suitable resource, or a combination thereof.

As data redundancy can be lost upon failure of a PD, if the RAID controller detects a predictive failure indication for one of the RAID level 0 PDs in the DG, then it is important for the customer to change the indicated PD as soon as possible with a replacement PD. Otherwise, an additional drive failure can result in data loss. If no replacement PD is available, then the RAID controller does not provide its full level of data redundancy in the failed state. Thus, data loss may result because of unavailability of a replacement PD and the inability of the RAID controller to allow reconstruction of the VD using a DG of fewer than the original number of PDs.

Figure 2:
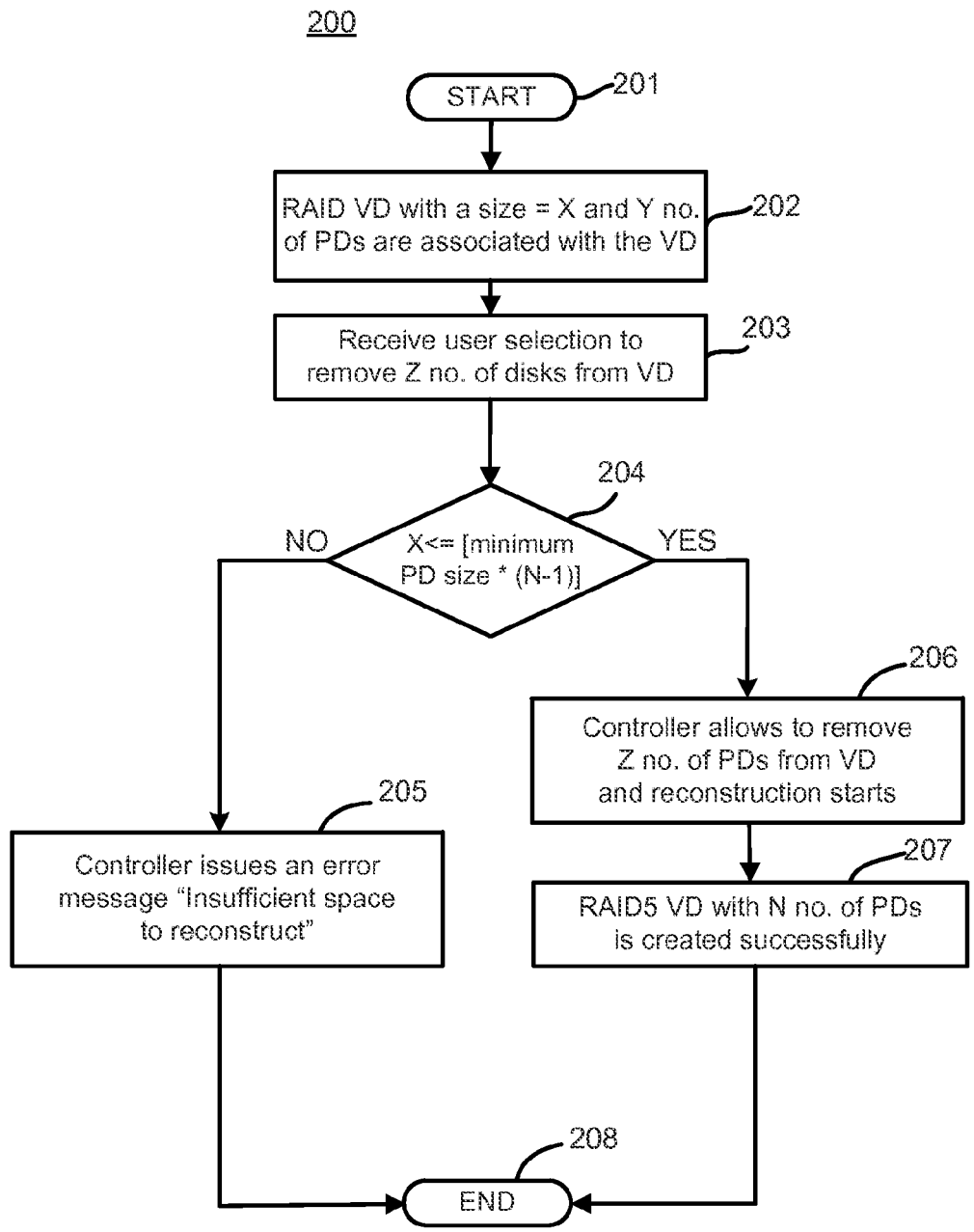
FIG. 2 is a flow diagram illustrating a method for reconstruction of a virtual disk (VD) in an array of information storage devices by physical disk (PD) reduction without losing data in accordance with at least one embodiment.

FIG. 2 is a flow diagram illustrating a method for reconstruction of a VD in an array of information storage devices by PD reduction without losing data in accordance with at least one embodiment. Method 200 begins in block 201. From block 201, method 200 continues to block 202. In block 202, disk controller 150 provides a RAID level 5 VD with a size of X by associating a number Y of PDs with the VD. From block 202, method 200 continues to block 203. In block 203, disk controller 150 receives a user selection to remove a number Z of PDs from the VD. From block 203, method 200 continues to decision block 204. In decision block 204, a decision is made as to whether or not the size X is less than or equal to the product of a minimum PD capacity and the quantity (N−1). If not, method 200 continues to block 205. In block 205, disk controller 150 issues an error message that insufficient space is available to reconstruct the VD using the reduced number of PDs. From block 205, the method continues to block 208, where it ends. If, in decision block 204, the decision is made that the size X is less than or equal to the product of the minimum PD capacity and the quantity (N−1), method 200 continues to block 206. In block 206, disk controller 150 allows the removal of the number Z of PDs from the VD and performs reconstruction of the VD using the reduced number of PDs.

From block 206, method 200 continues to block 207. In block 207, a RAID level 5 VD with the number N of PDs is created successfully. From block 207, method 200 continues to block 208, where it ends.

As an example, method 200 can be applied to a RAID level 5 VD realized with four PDs (for example, HDD1 (100 GB), HDD2 (100 GB), HDD3 (100 GB), HDD4 (100 GB)) with a VD size of, for example, 50 GB, as shown in block 202. Accordingly, the used disk space of each of the four PDs will be 12.5 GB. Even if one PD were to be removed from the DG, the remaining PDs would still have enough capacity to accommodate the data of the VD. So the controller will allow a user to select a number (for example, one) of PDs to be removed and to identify the particular disk or disks to be removed, as shown in block 203. For example, a user may select HDD4 to be removed. After selecting the HDD4, all the data in HDD4 (for example, 12.5 GB) can be accommodated in other PDs HDD1, HDD2, and HDD3.

Initially, the VD capacity can calculated by multiplying the minimum PD capacity in the VD by (N−1), where N is the number of PDs currently used to realize the VD and the subtraction of one corresponds to the allowance of one disk failure under RAID level 5. For example, in the case of a DG of four PDs of 100 GB each, 100 GB*(4−1)=300 GB. Here, the minimum PD capacity is 100 GB, the total number of PDs used to realize the VD, N, is four. While a VD capacity of 300 GB is supported by the existing PDs, as noted above, in this example, only 50 GB of those 300 GB are currently used to store data.

A reconstructed VD capacity calculation is performed. The VD capacity for a reconstructed DG having a reduced number of PDs is calculated by multiplying the minimum PD capacity in the VD by (N−1), where N is the reduced number of PDs to be used to realize the VD. For example, in the case of a DG of four PDs of 100 GB each to be reduced to three PDs of 100 GB each, the calculation is 100 GB*(3−1)=200 GB. Here, the minimum PD capacity is 100 GB, the total number of PDs to be used to realize the reconstructed VD, N, is three. The subtraction of one is allowed under the one disk failure allowed in RAID level 5. Thus, a VD capacity of 200 GB can be supported by the remaining PDs after the removal of the one PD from the DG. As shown in block 204, a decision is made by the controller as to whether or not the existing VD usage is less than or equal to the calculated VD capacity that the reduced number of PDs will provide. Since the existing VD usage of 50 GB is less than the calculated VD capacity of 200 GB for the reconstructed VD, the "yes" branch from decision block 204 is taken. Thus, the controller will allow the user to initiate migration of the VD realization, and reconstruction will start from a RAID level 5 VD realized using four disks and end with a RAID level 5 VD realized using three disks.

In the above example, the VD capacity is 50 GB, so the controller can remove the HDD4, reconstruction will start, and data in the HDD4 will copied to other HDDs, for example, HDD1, HDD2, and HDD3, as shown in block 206. Once after the reconstruction is completed, as shown in block 207, the VD usage will remain the same 50 GB and individual used disk space will be 16.6 GB, for example, HDD1 (16.6 GB/100 GB), HDD2 (16.6 GB/100 GB), and HDD3 (16.6 GB/100 GB). As the controller firmware has access to information describing the capacity and individual used disk space for all the RAID levels and the same information is available from the controller firmware interface, the controller has sufficient information with which to perform the method shown in FIG. 2.

While the specific example above illustrates operation according to method 200 of FIG. 2 for a RAID storage subsystem having a RAID level 5 VD with four PDs, it should be appreciated that method 200 of FIG. 2 can be applied to RAID level 5 VD with any number of PDs, provided removed disk data can be accommodated in other associated PDs. Also, it should be appreciated that method 200 of FIG. 2 can be implemented in RAID storage subsystems of other RAID levels, for example, RAID level 10 and RAID level 50.

Method 200 of FIG. 2 may also be implemented in RAID storage subsystems for RAID level 6 or RAID level 60. Because RAID level 6 and RAID level 60 have dual parity and allow for up to two PD failures, the VD capacity calculation is instead as follows: Minimum PD capacity*(N−2)=VD capacity.

According to the method described above, a user can remove a physical drive from a DG comprising several physical drives without deleting any existing VD from the RAID storage subsystem. As one example, the removed PD can be assigned as a DHS or a GHS for an VD, which can help prevent risk of data loss after one of the remaining PDs from which the VD is realized becomes unreliable or fails.

In accordance with at least one embodiment, as a RAID storage subsystem is used by a customer in the field, a PD may be removed from a DG of a RAID storage subsystem and the VD reconstructed from the remaining PDs of the DG upon detection of a predictive failure indication for the PD to avoid RAID levels such as 5, 6, 10, 50, and 60 going to a degraded state.

Thus, the redundancy and robustness of a RAID storage subsystem can be maintained even if a replacement PD is not immediately available to replace a PD that has failed or is indicated as likely to fail.

In such situation, the RAID controller is configured to allow removal of a PD from the DG and reconstruction of the VD realized by the DG formerly including the removed PD, provided the capacity of the reconstructed VD will be larger than or equal to the amount of capacity used by data for the VD before the removal of the PD from the DG. In such case, there is reduction of capacity in the DG by employing a subset of the original number of PD, but such reduction is reversible, not necessarily permanent. For example, if a replacement PD becomes available, the VD may be reconstructed to include the replacement PD in the DG, which can increase the capacity of VD to less than, the same as, or more than the original capacity of the VD before removal of the PD from the DG.

Figure 3:
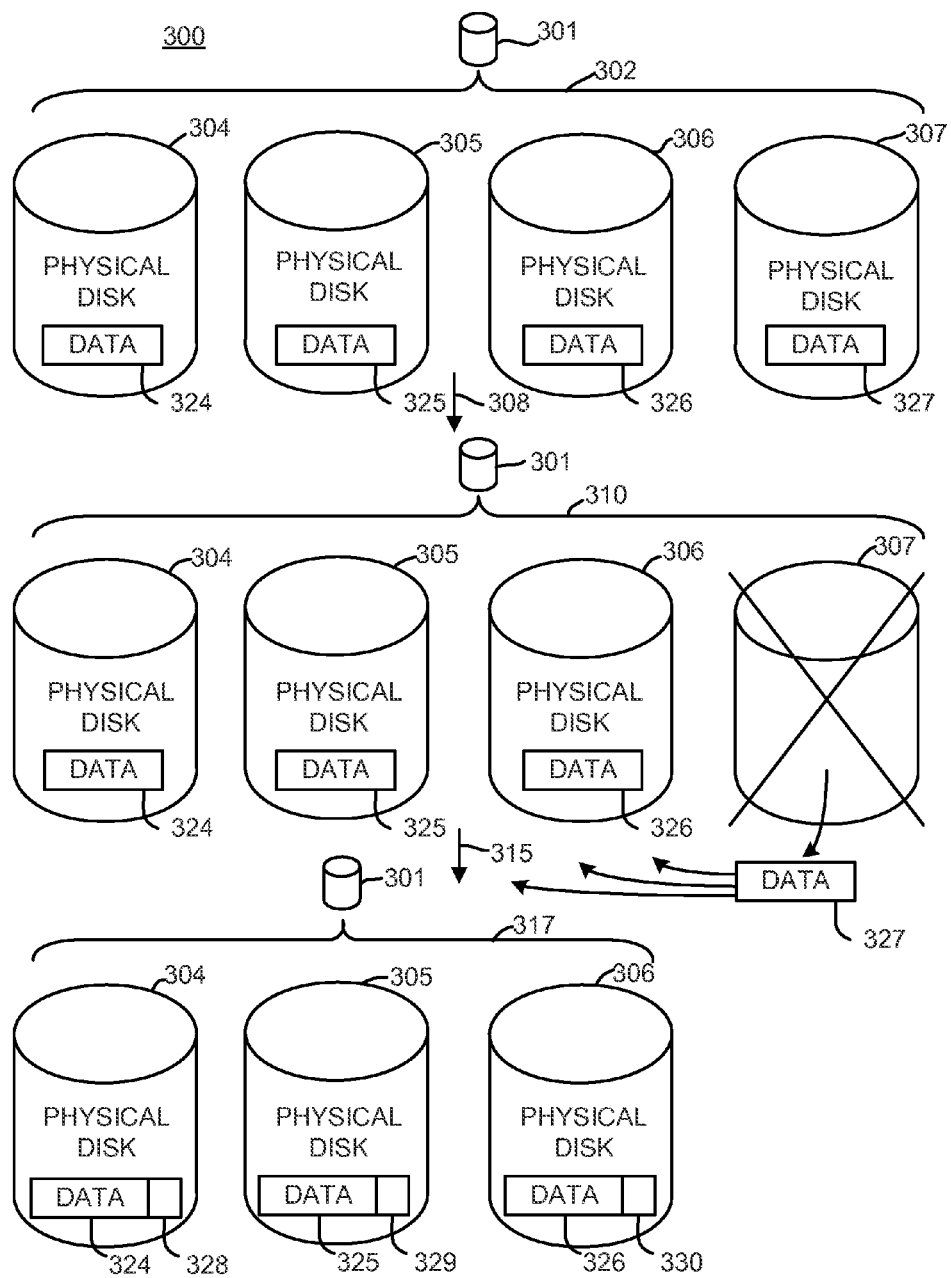
FIG. 3 is a block diagram illustrating an array of information storage devices as it undergoes reconstruction of a virtual disk (VD) without losing data in accordance with at least one embodiment.

FIG. 3 is a block diagram illustrating a progression of an array of information storage devices as it undergoes reconstruction of a VD without losing data in accordance with at least one embodiment. Progression 300 begins with an initial instance of VD 301 being realized, from a physical perspective, by a DG 302 comprising a plurality of PDs 304, 305, 306, and 307. Physical disk 304 stores data 324. Physical disk 305 stores data 325. Physical disk 306 stores data 326. Physical disk 307 stores data 327. Collectively, data 324-327 constitute the information stored on VD 301. A RAID controller presents information stored on PDs 304, 305, 306, and 307 in DG 302 as being stored on VD 301 in accordance with a RAID mapping. Thus, the RAID storage subsystem comprises, from a logical perspective, VD 301. Progression 300 proceeds via transition 308 from the initial instance to an intermediate instance of VD 301, where a user selection has been received to select among DG 310 comprising a plurality of PDs 304, 305, 306, and 307 a subset pertinent to reconstruction of VD 301. For example, a user selection may indicate PD 307 is to be removed from being used to realize VD 301. As another example, a user selection may indicate PDs 304, 305, and 306 are to be used to realize VD 301. Physical disk 304 continues to store data 324, physical disk 305 continues to store data 325, and physical disk 306 continues to store data 326. While RAID storage subsystems are often robust enough to allow loss of data of one or more physical disks, such as data 327 of PD 307, for the array remaining after the removal of PD 307 from DG 302 to have sufficient robustness to function as a RAID array, data 327 or other data to provide the redundancy to maintain robustness needs to be stored on the PDs of the DG for the VD that is reconstructed after the removal of PD 307 from DG 302. Progression 300 proceeds via transition 315 from the intermediate instance of VD 301 to a reconstructed instance of VD 301, where DG 317 comprising a plurality of PDs 304, 305, and 306, but not PD 307, are used to realize VD 301. Physical disk 304 continues to store data 324, physical disk 305 continues to store data 325, and physical disk 306 continues to store data 326, but additional data 328 is also stored on physical disk 304, additional data 329 is also stored on physical disk 305, and additional data 330 is also stored on physical disk 306. Additional data 328, 329, and 330 may be portions of what was data 327 or they may be other data sufficient to provide the redundancy needed to bring DG 317 comprising PDs 304, 305, and 306 and realizing the reconstructed instance of VD 301 to the desired level of robustness as a RAID array.

In accordance with at least one embodiment, a RAID controller is configured to allow a user to migrate a RAID (for example, RAID level 5) VD implemented using a DG comprising an initial number (for example, four) of PDs to be implemented using a DG comprising fewer than the initial number (for example, three) of PDs while preserving the stored data of the RAID VD. Embodiments may be applied to any other RAID levels such as RAID level 6, 10, 50, and 60 other than RAID level 1, for which the RAID minimum and maximum required PD is two PDs. According to at least one embodiment, the number of PDs of a DG for a RAID VD may be reduced without deleting the VD and without removal of data from the VD. Thus, for example, one or more PDs in a DG used to realize a VD in a RAID storage subsystem may be freed from use in the DG of the RAID storage subsystem without deleting the VD and without removing data from the VD.

As an example, if the controller controls a RAID level 5 VD created with four or more PDs (as RAID level 5 requires minimum three PDs to create a VD), the number of PDs used to realize the VD may be reduced provided there are enough remaining PDs to satisfy the minimum PD requirements imposed by the RAID level (for example, a minimum of three PDs for RAID level 5) and the storage capacity of the remaining PDs is sufficient to store the data of the VD. A PD removed from the DG may be used, for example, for creating a new VD or to assign as a dedicated hot spare (DHS) or global hot spare (GHS). A user can do a disk level migration within same DG (for example, migration of a RAID level 5 VD from four PDs to three PDs) without losing any data and without interrupting any user activities.

In accordance with at least one embodiment, a method comprises receiving a request to remove a selected physical disk from a disk group, wherein the disk group realizes a virtual disk in a redundant array data storage subsystem, determining whether an amount of existing virtual disk usage is less than or equal to an amount of storage capacity of a lowest capacity physical disk of the disk group multiplied by a difference of a proposed number of physical disks to be included in the disk group and a maximum number of failed physical disks that can be tolerated, and, when the amount of existing virtual disk usage is less than or equal to the amount of lowest storage capacity of the lowest capacity physical disk of the disk group multiplied by the difference of the proposed number of physical disks to be included in the disk group and the maximum number of failed physical disks that can be tolerated, removing the selected physical disk from the disk group without deleting the virtual disk realized by the disk group and reconstructing the virtual disk to be realized by the disk group using only the proposed number of physical disks, wherein the proposed number of physical disks is less than an initial number of physical disks of the disk group. In accordance with at least one embodiment, the request further comprises detecting a predictive failure indication indicating the selected physical disk for removal. In accordance with at least one embodiment, the method further comprises, when the amount of existing virtual disk usage is greater than the amount of storage capacity of the lowest capacity physical disk of the disk group multiplied by the difference of the proposed number of physical disks to be included in the disk group and the maximum number of failed physical disks that can be tolerated, providing an error message without removing the selected physical disk from the disk group. In accordance with at least one embodiment, the method further comprises comparing a replacement physical disk storage capacity of a replacement physical disk to the lowest storage capacity, and, when the replacement physical disk capacity is greater than or equal to the lowest storage capacity, adding the replacement physical disk to the disk group without deleting the virtual disk realized by the disk group and reconstructing the virtual disk to be realized by the disk group including the replacement physical disk. In accordance with at least one embodiment, the method further comprises reconfiguring the selected physical disk to serve as a hot spare for the disk group. In accordance with at least one embodiment, the proposed number of physical disks is one less than the initial number of physical disks. In accordance with at least one embodiment, the receiving the request to remove the selected physical disk from the disk group is performed in absence of a fault indication for the selected physical disk. In accordance with at least one embodiment, the request is a user request received in response to user input.

In accordance with at least one embodiment, an information handling system comprises a disk group comprising an array of physical disks, the physical disks comprising a selected physical disk and a lowest capacity physical disk and a disk controller coupled to the disk group, the disk controller configured to receive a request to remove a selected physical disk from a disk group, to determine whether an amount of existing virtual disk usage is less than or equal to an amount of storage capacity of a lowest capacity physical disk of the disk group multiplied by a difference of a proposed number of physical disks to be included in the disk group and a maximum number of failed physical disks that can be tolerated, and, when the amount of existing virtual disk usage is less than or equal to the amount of lowest storage capacity of the lowest capacity physical disk of the disk group multiplied by the difference of the proposed number of physical disks to be included in the disk group and the maximum number of failed physical disks that can be tolerated, to remove the selected physical disk from the disk group without deleting the virtual disk realized by the disk group and to reconstruct the virtual disk to be realized by the disk group using only the proposed number of physical disks, wherein the proposed number of physical disks is less than an initial number of physical disks of the disk group. In accordance with at least one embodiment, the disk controller is further configured to detect a predictive failure indication indicating the selected physical disk for removal. In accordance with at least one embodiment, the disk controller is further configured, when the amount of existing virtual disk usage is greater than the amount of storage capacity of the lowest capacity physical disk of the disk group multiplied by the difference of the proposed number of physical disks to be included in the disk group and the maximum number of failed physical disks that can be tolerated, to provide an error message without removing the selected physical disk from the disk group. In accordance with at least one embodiment, the disk controller is further configured to compare a replacement physical disk storage capacity of a replacement physical disk to the lowest storage capacity, and, when the replacement physical disk capacity is greater than or equal to the lowest storage capacity, to add the replacement physical disk to the disk group without deleting the virtual disk realized by the disk group and reconstructing the virtual disk to be realized by the disk group including the replacement physical disk. In accordance with at least one embodiment, the disk controller is further configured to reconfigure the selected physical disk to serve as a hot spare for the disk group. In accordance with at least one embodiment, the proposed number of physical disks is one less than the initial number of physical disks. In accordance with at least one embodiment, the disk controller is configured to receive the request to remove the selected physical disk from the disk group in absence of a fault indication for the selected physical disk.

In accordance with at least one embodiment, a nontransitory computer readable medium comprises instruction code executable by a processor to cause the processor to receive a request to remove a selected physical disk from a disk group, wherein the disk group realizes a virtual disk in a redundant array data storage subsystem, to determine whether an amount of existing virtual disk usage is less than or equal to an amount of storage capacity of a lowest capacity physical disk of the disk group multiplied by a difference of a proposed number of physical disks to be included in the disk group and a maximum number of failed physical disks that can be tolerated, and, when the amount of existing virtual disk usage is less than or equal to the amount of lowest storage capacity of the lowest capacity physical disk of the disk group multiplied by the difference of the proposed number of physical disks to be included in the disk group and the maximum number of failed physical disks that can be tolerated, to remove the selected physical disk from the disk group without deleting the virtual disk realized by the disk group and reconstruct the virtual disk to be realized by the disk group using only the proposed number of physical disks, wherein the proposed number of physical disks is less than an initial number of physical disks of the disk group. In accordance with at least one embodiment, the nontransitory computer readable medium further comprises instruction code executable by the processor to cause the processor, when the amount of existing virtual disk usage is greater than the amount of storage capacity of the lowest capacity physical disk of the disk group multiplied by the difference of the proposed number of physical disks to be included in the disk group and the maximum number of failed physical disks that can be tolerated, to provide an error message without removing the selected physical disk from the disk group. In accordance with at least one embodiment, the nontransitory computer readable medium further comprises instruction code executable by the processor to compare a replacement physical disk storage capacity of a replacement physical disk to the lowest storage capacity, and, when the replacement physical disk capacity is greater than or equal to the lowest storage capacity, to add the replacement physical disk to the disk group without deleting the virtual disk realized by the disk group and reconstructing the virtual disk to be realized by the disk group including the replacement physical disk. In accordance with at least one embodiment, the nontransitory computer readable medium further comprises instruction code executable by the processor to cause the processor to reconfigure the selected physical disk to serve as a hot spare for the disk group. In accordance with at least one embodiment, the proposed number of physical disks is one less than the initial number of physical disks.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding, or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to store information received via carrier wave signals such as a signal communicated over a transmission medium. Furthermore, a computer readable medium can store information received from distributed network resources such as from a cloud-based environment. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

In the embodiments described herein, an information handling system includes any instrumentality or aggregate of instrumentalities operable to compute, classify, process, transmit, receive, retrieve, originate, switch, store, display, manifest, detect, record, reproduce, handle, or use any form of information, intelligence, or data for business, scientific, control, entertainment, or other purposes. For example, an information handling system can be a personal computer, a consumer electronic device, a network server or storage device, a switch router, wireless router, or other network communication device, a network connected device (cellular telephone, tablet device, etc.), or any other suitable device, and can vary in size, shape, performance, price, and functionality.

The information handling system can include memory (volatile (for example random-access memory, etc.), non-volatile (read-only memory, flash memory etc.) or any combination thereof), one or more processing resources, such as a central processing unit (CPU), a graphics processing unit (GPU), hardware or software control logic, or any combination thereof. Additional components of the information handling system can include one or more storage devices, one or more communications ports for communicating with external devices, as well as, various input and output (I/O) devices, such as a keyboard, a mouse, a video/graphic display, or any combination thereof. The information handling system can also include one or more buses operable to transmit communications between the various hardware components. Portions of an information handling system may themselves be considered information handling systems.

When referred to as a "device," a "module," or the like, the embodiments described herein can be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCMCIA) card, or other such expansion card), or a system (such as a motherboard, a system-on-a-chip (SoC), or a stand-alone device).

The device or module can include software, including firmware embedded at a device, such as a Pentium class or PowerPC™ brand processor, or other such device, or software capable of operating a relevant environment of the information handling system. The device or module can also include a combination of the foregoing examples of hardware or software. Note that an information handling system can include an integrated circuit or a board-level product having portions thereof that can also be any combination of hardware and software.

Devices, modules, resources, or programs that are in communication with one another need not be in continuous communication with each other, unless expressly specified otherwise. In addition, devices, modules, resources, or programs that are in communication with one another can communicate directly or indirectly through one or more intermediaries.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:

1. A method comprising:
  receiving a request to remove a selected physical disk from a disk group, wherein the disk group realizes a virtual disk in a redundant array data storage subsystem;
  determining whether an amount of existing virtual disk usage is less than or equal to an amount of storage capacity of a lowest capacity physical disk of the disk group multiplied by a difference of a proposed number of physical disks to be included in the disk group and a maximum number of failed physical disks that can be tolerated; and
  when the amount of existing virtual disk usage is less than or equal to the amount of lowest storage capacity of the lowest capacity physical disk of the disk group multiplied by the difference of the proposed number of physical disks to be included in the disk group and the maximum number of failed physical disks that can be tolerated, removing the selected physical disk from the disk group without deleting the virtual disk realized by the disk group and reconstructing the virtual disk to be realized by the disk group using only the proposed number of physical disks, wherein the proposed number of physical disks is less than an initial number of physical disks of the disk group.

2. The method of claim 1, wherein the receiving the request further comprises:
  detecting a predictive failure indication indicating the selected physical disk for removal.

3. The method of claim 1, further comprising:
  when the amount of existing virtual disk usage is greater than the amount of storage capacity of the lowest capacity physical disk of the disk group multiplied by the difference of the proposed number of physical disks to be included in the disk group and the maximum number of failed physical disks that can be tolerated, providing an error message without removing the selected physical disk from the disk group.

4. The method of claim 1, further comprising:
  comparing a replacement physical disk storage capacity of a replacement physical disk to the lowest storage capacity; and
  when the replacement physical disk capacity is greater than or equal to the lowest storage capacity, adding the replacement physical disk to the disk group without deleting the virtual disk realized by the disk group and reconstructing the virtual disk to be realized by the disk group including the replacement physical disk.

5. The method of claim 1, further comprising:
  reconfiguring the selected physical disk to serve as a hot spare for the disk group.

6. The method of claim 1, wherein the proposed number of physical disks is one less than the initial number of physical disks.

7. The method of claim 1, wherein the receiving the request to remove the selected physical disk from the disk group is performed in absence of a fault indication for the selected physical disk.

8. The method of claim 1, wherein the request is a user request received in response to user input.

9. An information handling system comprising:
a disk group comprising an array of physical disks, the physical disks comprising a selected physical disk and a lowest capacity physical disk; and
a disk controller coupled to the disk group, the disk controller configured to receive a request to remove a selected physical disk from a disk group, to determine whether an amount of existing virtual disk usage is less than or equal to an amount of storage capacity of a lowest capacity physical disk of the disk group multiplied by a difference of a proposed number of physical disks to be included in the disk group and a maximum number of failed physical disks that can be tolerated, and, when the amount of existing virtual disk usage is less than or equal to the amount of lowest storage capacity of the lowest capacity physical disk of the disk group multiplied by the difference of the proposed number of physical disks to be included in the disk group and the maximum number of failed physical disks that can be tolerated, to remove the selected physical disk from the disk group without deleting the virtual disk realized by the disk group and to reconstruct the virtual disk to be realized by the disk group using only the proposed number of physical disks, wherein the proposed number of physical disks is less than an initial number of physical disks of the disk group.

10. The information handling system of claim 9, wherein the disk controller is further configured to detect a predictive failure indication indicating the selected physical disk for removal.

11. The information handling system of claim 9, wherein the disk controller is further configured, when the amount of existing virtual disk usage is greater than the amount of storage capacity of the lowest capacity physical disk of the disk group multiplied by the difference of the proposed number of physical disks to be included in the disk group and the maximum number of failed physical disks that can be tolerated, to provide an error message without removing the selected physical disk from the disk group.

12. The information handling system of claim 9, wherein the disk controller is further configured to compare a replacement physical disk storage capacity of a replacement physical disk to the lowest storage capacity, and, when the replacement physical disk capacity is greater than or equal to the lowest storage capacity, to add the replacement physical disk to the disk group without deleting the virtual disk realized by the disk group and reconstructing the virtual disk to be realized by the disk group including the replacement physical disk.

13. The information handling system of claim 9, wherein the disk controller is further configured to reconfigure the selected physical disk to serve as a hot spare in the information handling system.

14. The information handling system of claim 9, wherein the proposed number of physical disks is one less than the initial number of physical disks.

15. The information handling system of claim 9, wherein the disk controller is configured to receive the request to remove the selected physical disk from the disk group in absence of a fault indication for the selected physical disk.

16. A nontransitory computer readable medium comprising instruction code executable by a processor to cause the processor to:
receive a request to remove a selected physical disk from a disk group, wherein the disk group realizes a virtual disk in a redundant array data storage subsystem;
determine whether an amount of existing virtual disk usage is less than or equal to an amount of storage capacity of a lowest capacity physical disk of the disk group multiplied by a difference of a proposed number of physical disks to be included in the disk group and a maximum number of failed physical disks that can be tolerated; and
when the amount of existing virtual disk usage is less than or equal to the amount of lowest storage capacity of the lowest capacity physical disk of the disk group multiplied by the difference of the proposed number of physical disks to be included in the disk group and the maximum number of failed physical disks that can be tolerated, remove the selected physical disk from the disk group without deleting the virtual disk realized by the disk group and reconstruct the virtual disk to be realized by the disk group using only the proposed number of physical disks, wherein the proposed number of physical disks is less than an initial number of physical disks of the disk group.

17. The nontransitory computer readable medium of claim 16, further comprising instruction code executable by the processor to cause the processor, when the amount of existing virtual disk usage is greater than the amount of storage capacity of the lowest capacity physical disk of the disk group multiplied by the difference of the proposed number of physical disks to be included in the disk group and the maximum number of failed physical disks that can be tolerated, to provide an error message without removing the selected physical disk from the disk group.

18. The nontransitory computer readable medium of claim 16, further comprising instruction code executable by the processor to compare a replacement physical disk storage capacity of a replacement physical disk to the lowest storage capacity, and, when the replacement physical disk capacity is greater than or equal to the lowest storage capacity, to add the replacement physical disk to the disk group without deleting the virtual disk realized by the disk group and reconstructing the virtual disk to be realized by the disk group including the replacement physical disk.

19. The nontransitory computer readable medium of claim 16, further comprising instruction code executable by the processor to cause the processor to reconfigure the selected physical disk to serve as a hot spare for the disk group.

20. The nontransitory computer readable medium of claim 16, wherein the proposed number of physical disks is one less than the initial number of physical disks.

* * * * *